(12) United States Patent
Mercurio et al.

(10) Patent No.: US 6,843,019 B2
(45) Date of Patent: Jan. 18, 2005

(54) HORTICULTURAL GREENHOUSE WITH REMOVABLE COVER

(76) Inventors: Joseph Mercurio, 7 Quartier Carques, 13750 Plan D'Orgon (FR); David Mercurio, Jardin de Craponne, Bâtiment B, 13300 Salon de Provence (FR)

( * ) Notice: Subject to any disclaimer, the term of this patent is extended or adjusted under 35 U.S.C. 154(b) by 0 days.

(21) Appl. No.: 10/309,728

(22) Filed: Dec. 4, 2002

(65) Prior Publication Data

US 2003/0070353 A1 Apr. 17, 2003

Related U.S. Application Data

(63) Continuation of application No. PCT/FR01/01721, filed on Jun. 5, 2001.

(30) Foreign Application Priority Data

Jun. 8, 2000 (FR) .......................................... 00 07314

(51) Int. Cl.[7] ................................................. A01G 9/14
(52) U.S. Cl. ................................... 47/17; 52/63; 52/66
(58) Field of Search .......................... 47/17, 29.5, 29.6, 47/32.1; 52/63, 64, 65, 66, 67, 2.17, 2.24, 2.26

(56) References Cited

U.S. PATENT DOCUMENTS

| | | | | |
|---|---|---|---|---|
| 4,012,867 A | * | 3/1977 | Lainchbury et al. | 47/17 |
| 4,027,437 A | * | 6/1977 | Monsky et al. | |
| 4,064,648 A | * | 12/1977 | Cary | 47/17 |
| 4,103,368 A | * | 8/1978 | Lockshaw | 126/566 |
| 4,273,099 A | * | 6/1981 | Morgan | 126/625 |
| 4,297,813 A | * | 11/1981 | Farrell et al. | 52/2.17 |
| 4,301,626 A | * | 11/1981 | Davis et al. | 52/2.17 |
| 4,305,235 A | * | 12/1981 | Roston | 52/2.17 |
| 4,318,251 A | * | 3/1982 | Winkler | 52/2.17 |
| 4,348,833 A | | 9/1982 | Nagoya | |
| 4,352,259 A | * | 10/1982 | Smith et al. | 52/2.17 |
| 4,387,533 A | * | 6/1983 | Green et al. | 47/17 |
| 4,426,995 A | * | 1/1984 | Wilson | 126/625 |
| 4,432,342 A | * | 2/1984 | Lucas et al. | 126/570 |
| 4,506,720 A | * | 3/1985 | Iwanicki | 160/26 |
| 4,510,921 A | * | 4/1985 | Yano et al. | 126/619 |
| 4,577,436 A | * | 3/1986 | Dalle | 47/17 |
| 4,672,889 A | * | 6/1987 | Lynch | 454/364 |
| 4,815,365 A | * | 3/1989 | Dupont | 454/254 |
| 4,924,651 A | * | 5/1990 | Plant | 52/745.13 |
| 5,038,517 A | | 8/1991 | Talbott | |
| 5,335,447 A | * | 8/1994 | Bee | 47/17 |
| 5,913,775 A | * | 6/1999 | Delamare | 52/2.11 |
| 6,000,170 A | * | 12/1999 | Davis | 47/17 |
| 6,061,969 A | * | 5/2000 | Leary | 52/2.11 |
| 6,070,366 A | * | 6/2000 | Pierson | 52/2.17 |
| 6,260,308 B1 | * | 7/2001 | Looney | 52/63 |
| 6,282,834 B1 | * | 9/2001 | Mossey | 47/17 |
| 6,442,903 B1 | * | 9/2002 | Hebert | 52/2.11 |

FOREIGN PATENT DOCUMENTS

| | | | |
|---|---|---|---|
| DE | 2802719 | * | 7/1979 |
| DE | 90 17 542.5 U1 | | 5/1991 |
| DE | 91 03 345.4 U1 | | 6/1991 |
| EP | 0 260 480 A1 | | 3/1988 |
| FR | 2 431 827 A1 | | 2/1980 |
| FR | 2592273 | * | 7/1987 |
| FR | 2672333 | * | 8/1992 |
| FR | 2700234 | * | 7/1994 |
| FR | 2 801 622 A1 | | 6/2001 |
| GB | 1550488 | * | 8/1979 |
| GB | 2 194 271 A | | 3/1988 |
| JP | 5-84024 | * | 4/1993 |
| JP | 5-304838 | * | 11/1993 |
| JP | 6-181644 | * | 7/1994 |
| JP | 6-217651 | * | 8/1994 |

\* cited by examiner

*Primary Examiner*—Peter M. Poon
(74) *Attorney, Agent, or Firm*—Akin Gump Strauss Hauer & Feld , LLP (57) ABSTRACT

A roll-up cover system includes a tarpaulin (30) having a fixed edge (30-1) and a free edge (30-2) secured to a winding shaft (31), in which the tarpaulin is of the double-membrane inflatable type (30a, 30b) and all or part of the unwinding of the tarpaulin is carried out by inflating the tarpaulin, the inflating pressure occurring in the tarpaulin unwinding the tarpaulin or contributing to the unwinding force. The roll-up cover system has particular application to horticultural greenhouses.

10 Claims, 6 Drawing Sheets

Fig. 1

Prior Art

HORTICULTURAL GREENHOUSE WITH REMOVABLE COVER

CROSS-REFERENCE TO RELATED APPLICATIONS

This application is a continuation of International Application No. PCT/FR01/01721, filed Jun. 5, 2001.International Application No. PCT/FR01/01721 was published in French under PCT Article 21(2) on Dec. 13, 2001 as International Publication No. WO 01/93663 A1.

BACKGROUND OF THE INVENTION

The present invention relates to a roll-up cover system, particularly to ventilate and adjust the temperature of horticultural greenhouses, and a horticultural greenhouse fitted with this cover system.

In temperate climate regions, greenhouses are an essential means for growing certain varieties of plants, fruits or vegetables. Thus, large farming estates are frequently equipped with several tens of horticultural greenhouses that protect the species grown from the cold, these greenhouses possibly being approximately one hundred meters long and approximately ten meters wide.

In order to adjust the temperature of the greenhouse that is necessary for the growth of the species grown, many greenhouses said to have "removable covers" are equipped with opening leaves that enable them to be ventilated when the temperature becomes too high due to the sun.

Figure 1:
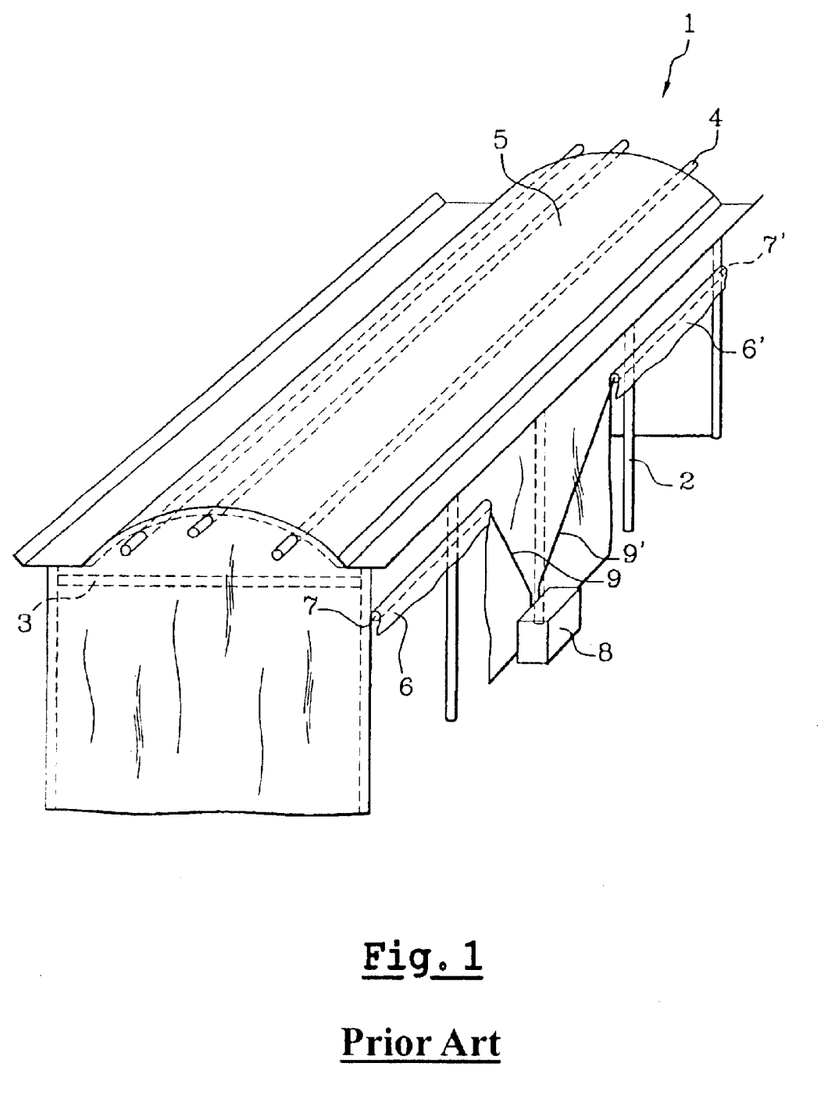
FIG. 1 described above represents a classical greenhouse fitted with motorised opening leaves.

As an example, FIG. 1 schematically represents a model of a greenhouse 1 spread out comprising a frame or structure produced by assembling jambs 2, cross-pieces 3 and stringers 4, covered with a tarpaulin 5 made of transparent plastic, the vertical walls of the greenhouse being formed by a rigid or semi-rigid material fixed to the jambs. The tarpaulin 5 can be of the single-membrane type or of the double-membrane type, the double-membrane tarpaulins being inflatable and providing better heat insulation and resistance to the wind than single-membrane tarpaulins.

The greenhouse 1 has two openings, on each of its large sides, fitted with sorts of electric "screens", made up of tarpaulins 6, 6' wound onto shafts 7, 7'. The shafts 7, 7' are driven by an electrical motor 8 through two universal joints 9, 9'. The motor 8 is itself controlled by a temperature adjustment system (not represented) that rolls up or unwinds the tarpaulins 6, 6' according to the temperature in the greenhouse.

This type of greenhouse with automatic adjustment is inconvenient in that it requires at least two motors per greenhouse. Equipping a farm comprising many greenhouses of this type therefore requires purchasing and maintaining a substantial number of motors and the installation of a complex network of cables to distribute electricity.

There are also known models of greenhouses having motorised opening leaves arranged on the roof, that can be driven by a single motor. However, these opening leaves require a complex system of racks to unwind or roll up tarpaulins in a substantially horizontal plane.

Generally speaking, the roll-up tarpaulins of the opening leaves of greenhouses, whether they are arranged on the walls or on the roofs of the greenhouses, are inconvenient in that they are limp and little resistant to the wind, while the fixed tarpaulin covering the rest of a greenhouse can be chosen to be of the double-membrane inflatable type.

Another inconvenience of the known roll-up cover systems is that they require at least one motor per greenhouse, due to the mechanical losses by friction occurring in the transmission elements such as the universal joints and the racks.

The document DE9103345 describes a greenhouse fitted with a double-membrane tarpaulin [3, 4] in which the winding and unwinding of the tarpaulin is carried out by an automatic winder made up of two electric carriages [8, 9] mounted onto rollers [23] that run on guide rails [22]. These winding and unwinding carriages are secured to a winding cylinder [21] through a cylinder motor [19] of the blind motor type, equipped with a motor brake. The inflatable tarpaulin is linked to the output of a pressure generator [15, 16] through orifices [17]. The pressure in the tarpaulin is adjusted according to the climatic conditions to provide more or less heat insulation. The tarpaulin is inflated when the limit stop position is reached so as to create a heat insulation space [5]. In addition to the winding and unwinding carriages, this cover system according to the prior art is equipped with a return motion system comprising a cord [25] and a counterweight [26] that pull the carriages [8, 9] in an unwinding direction. It can also be seen in FIG. 2 of this document that the position of the tarpaulin is such that the unwinding is done in the direction of the low part of the inclined plane on which the tarpaulin rests, such that three means are involved in the unwinding of the tarpaulin: firstly the automatic winders or motorised carriages [8, 9], secondly the counterweights [26] attached to the carriages by the cords [25], and finally gravity itself, due to the arrangement of the tarpaulin that has just been mentioned. This document therefore describes a motorised cover system that is conventional in itself, of substantial complexity and a considerable cost price, in which the tarpaulin is a double-membrane inflatable tarpaulin instead of being a single-membrane tarpaulin.

BRIEF SUMMARY OF THE INVENTION

Thus, one general object of the present invention is to provide a roll-up cover system that is easy to unwind while being simple in structure and having good resistance to the wind.

To achieve this object, the present invention provides a roll-up cover system, comprising a tarpaulin having a fixed edge and a free edge secured to a winding shaft, the tarpaulin being of the double-membrane inflatable type, in which the unwinding of the tarpaulin is carried out, either wholly or in part, by inflating the tarpaulin, the inflation pressure occurring in the tarpaulin unwinding the tarpaulin or contributing to the unwinding force.

According to one embodiment, the unwinding of the tarpaulin is solely carried out by inflating the tarpaulin, the free edge of the tarpaulin not being secured to any unwinding means.

According to one embodiment, the entire useable surface of the tarpaulin is of the double-membrane inflatable type.

According to one embodiment, the tarpaulin comprises at least one non-inflatable part and at least one double-membrane inflatable part stretching between the fixed edge and the free edge of the tarpaulin.

This inflatable tarpaulin has many advantages. Firstly, the tarpaulin has good rigidity granted by its inflating and can be arranged on roofs of greenhouses without floating or flapping in the wind, such that it is not necessary to provide a mechanism holding the tarpaulin tight. To hold the tarpaulin against a roof frame, it is sufficient to provide classical straps or any other equivalent means of holding, such as a net for example. Secondly, unwinding the tarpaulin by inflating requires reduced mechanical energy such that a single air compressor can enable several tarpaulins arranged on different greenhouses to be unwound. Finally, providing automatic unwinding of the tarpaulin solely by inflating allows a tarpaulin winding system to be provided that is simple in structure, that operates as a "follower" during the unwinding of the tarpaulin, this unwinding system also requiring reduced mechanical energy due to its simplicity.

Therefore, according to one aspect of the present invention, the winding of the tarpaulin is carried out by a rope system arranged to pull the winding shaft in a winding direction of the tarpaulin while turning the winding shaft in a winding direction of the tarpaulin.

According to one embodiment, the tarpaulin is arranged in an inclined plane, and is arranged so that the free edge of the tarpaulin moves towards the top of the inclined plane when unwinding the tarpaulin.

The present invention also relates to a horticultural greenhouse, comprising at least one cover system according to the present invention, the fixed edge of the tarpaulin being secured to the frame of the greenhouse.

According to one embodiment, the tarpaulin rests on elements of the ridge of the greenhouse and is pressed against these elements by holding means.

According to one embodiment, the greenhouse comprises a system for winding the tarpaulin comprising a traction rope to pull the winding-shaft in a winding direction of the tarpaulin, and a rotation rope to make the winding shaft turn in a winding direction of the tarpaulin.

According to one embodiment, the traction and rotation ropes cooperate in winding with pulleys chosen to be tapered in shape to compensate for the increasing thickness of the tarpaulin when it is being wound around the winding shaft.

According to one embodiment, the greenhouse comprises at least one compressor to unwind the tarpaulin by inflating, means for controlling the air pressure in the tarpaulin, a system for winding the tarpaulin, at least one decompression valve of the tarpaulin, at least one electrical motor to drive the winding system, and means for adjusting the temperature in the greenhouse, driving the compressor, the motor and the valve to roll up or unwind the tarpaulin depending on the difference between the temperature in the greenhouse and a desirable temperature.

The present invention also provides a set of greenhouses comprising at least two greenhouses according to the present invention, the greenhouses comprising shafts for driving tarpaulin winding systems that are rotationally coupled by means of a belt or a chain.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown.

In the drawings.

DETAILED DESCRIPTION OF THE INVENTION

Figure 2:
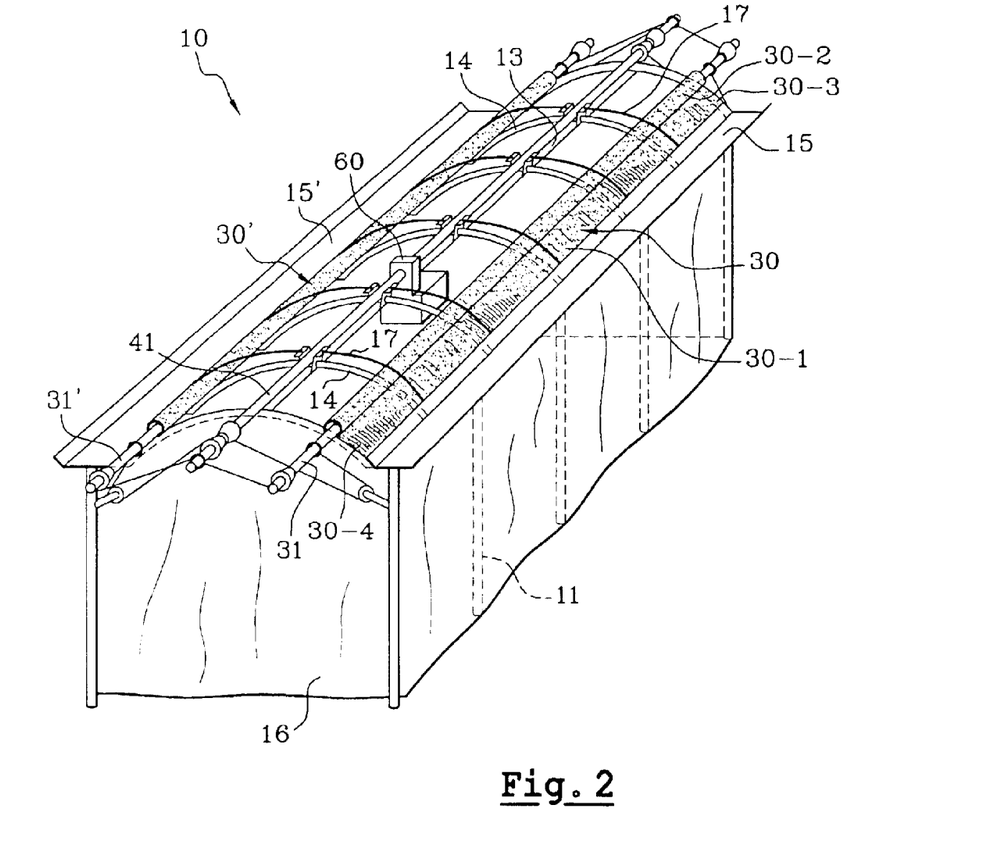
FIG. 2 is a perspective view of a greenhouse according to the present invention.

FIG. 2 is a general view of a greenhouse 10 according to the present invention, which classically comprises a frame or structure formed by assembling jambs 11, cross-pieces and stringers 13, the ridge of the greenhouse here being formed by bows 14 fixed onto the cross-pieces or onto the jambs. Gutters 15, 15' are arranged along the edges of the ridge of the greenhouse to avoid rainwater trickling down onto the vertical walls of the greenhouse, that are covered with a canvas or a tarpaulin 16 or any other rigid or semi-rigid material for greenhouse.

The ridge of the greenhouse is covered with a tarpaulin 30 according to the present invention placed on the bows 14 and held against the latter by straps 17 arranged at regular intervals on the ridge. The tarpaulin 30 is here arranged lengthways and comprises a fixed edge 30-1 attached to the right gutter 15 and a free edge 30-2 stretching in the direction of the top of the greenhouse 10. The free edge 30-2 of the tarpaulin is secured to a shaft 31 enabling the tarpaulin 30 to be rolled up in the direction of the right gutter 15 in order to open the ridge to cool down the greenhouse. The ridge is also covered by a second tarpaulin 30' similar to the tarpaulin 30, stretching between the left gutter 15' and the top of the greenhouse and winding around a shaft 31' to open the other half of the ridge.

Figure 3A:
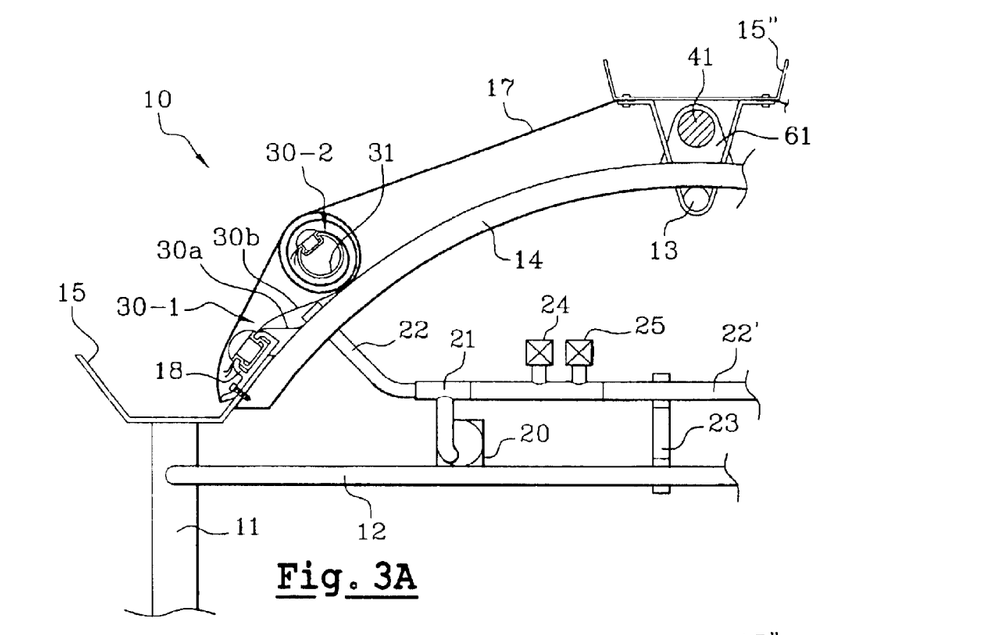
FIGS. 3A and 3B are cross-sections of a cover system according to the present invention, respectively in a rolled up position and an unwound position.
Figure 3B:
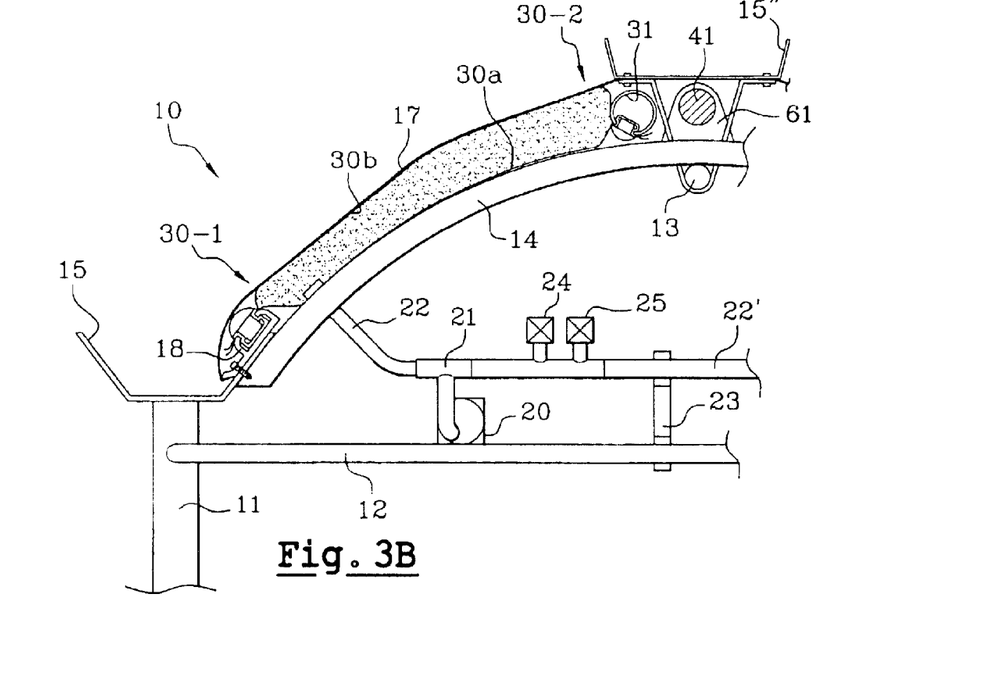

According to the present invention, the tarpaulin 30 is of the inflatable type and unwinds by inflating, the effect of the inflating being to push the free edge 30-2 of the tarpaulin in the direction of the top of the greenhouse, by driving the winding shaft 31, as will be more clearly understood with reference to FIGS. 3A and 3B.

FIG. 3A is a cross-section of the tarpaulin 30 in rolled up position. The roll formed by the tarpaulin wound around the shaft 31 is held against the bows 14 by the straps 17, that are here hooked between the side gutter 15 and a central gutter 15" placed at the top of the greenhouse. This central gutter 15", which has not been represented in FIG. 2 for reasons of clarity, is fixed onto the central stringer 13 of the ridge.

Figures 5, 6:
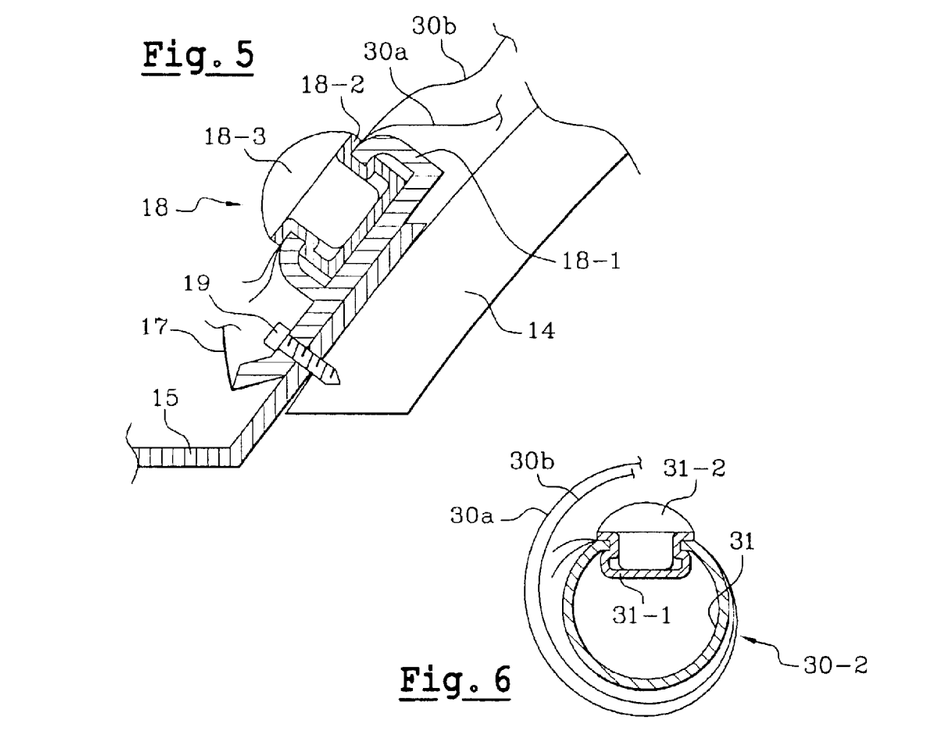
FIG. 5 is a cross-section of a holding part of the fixed edge of a tarpaulin according to the present invention.
FIG. 6 is a cross-section of a winding shaft of a tarpaulin according to the present invention.

In FIG. 3A, it can be seen that the tarpaulin 30 is made up of two membranes 30a, 30b that are held and pinched in a tight manner on the fixed edge 30-1 side of the tarpaulin by a part 18 secured to one edge of the gutter 15, the part 18 stretching over the whole length of the greenhouse. As will be more clearly understood in FIG. 5, the holding part 18 is screwed onto the bows 14 by self-tapping screws 19 that pass through the edge of the gutter 15 and simultaneously hold the latter. The part 18 has a "U"-shaped profile 18-1 enlarged at its base and the membranes 30a, 30b are pinched in the profile 18-1 by an elastic clamp or clip 18-2. The clip 18-2 is pushed into the profile 18-1 and blocked in this position by means of a part 18-3 that holds it open.

On the free edge 30-2 side of the tarpaulin, the membranes 30a, 30b are also pinched in a tight manner in the winding shaft 31. As will be more clearly understood in FIG. 6, the pinching of the membranes 30a, 30b in the shaft 31 is also carried out by a clip 31-1 that goes into a groove made in the shaft 31 and is blocked in the groove by a part 31-2 that holds it open.

On the lateral sides 30-3, 30-4 of the tarpaulin 30, visible in FIG. 2, the edges of the membranes 30a, 30b are assembled in a tight manner by any classical means, particularly by sticking or by heat welding. The welding of the membranes 30a, 30b along the edges 30-3, 30-4 can particularly by carried out by means of a heating clip when assembling the greenhouse, after cutting out the tarpaulin 30.

Again with reference to FIG. 3A, the inflating of the tarpaulin 30 is carried out by an electric compressor 20 the output of which is linked to a duct 22 through a tee 21. The end of the duct 22 passes through the membrane 30a through a sealing joint and discharges inside the tarpaulin 30, on the fixed edge 30-1 side. The other branch of the tee 21 is connected to a duct 22' discharging in a similar manner in the tarpaulin 30' (not represented) which covers the other half of the ridge.

The compressor 20 and the ducts 22, 22' are preferably arranged in the top part of the greenhouse so as to minimise the pressure drop and the number of bends in the piping. The compressor 20 is for example placed on a base borne by cross-pieces 12 and the ducts 22, 22' are fixed to cross-pieces 12 through cross-braces 23. A pressure probe 24 and a decompression valve 25 are also provided, the probe 24 enabling the inflating pressure of the tarpaulins 30, 30' to be controlled and the valve 25 enabling the tarpaulins 30, 30' to be deflated when they are rolled up. These elements 24, 25 are arranged here in one section of piping common to the two tarpaulins 30, 30' and enable the inflating or the deflating of the two tarpaulins to be simultaneously controlled. However, each tarpaulin 30, 30' can also be equipped with an individual pressure probe and an individual decompression valve if it is desirable to be able to unwind each tarpaulin independently from the other one, which implies adding solenoid valves to isolate the piping of the tarpaulin 30 and that of the tarpaulin 30'.

When the compressor 20 is switched on and injects air into the tarpaulin 30, the latter begins to inflate on its fixed edge 30-1 side that is held by the part 18. The inflated part pushes on the rolled up part which gradually unwinds until the winding shaft 31 stops under the central gutter 15", as shown in FIG. 3B. The shaft 31 does not actively contribute to the unwinding of the tarpaulin 30 and is simply pushed towards the top of the greenhouse. When the inflating is finished and the tarpaulin 30 is fully unwound, the membrane 30a is pressed against the bows 14 while the membrane 30b is pressed against the straps 17 by the air pressure. The unwinding of the tarpaulin 30' is produced simultaneously with the unwinding of the tarpaulin 30, in the same manner and in the same conditions.

Therefore, the unwinding mechanism of a tarpaulin according to the present invention is particularly simple and does not require any particular mechanism other than providing an inflatable tarpaulin and a compressor or any other means of injecting air. Furthermore, such a compressor can enable tarpaulins arranged on other greenhouses to be unwound, as will be seen below.

The description above was of a first aspect of the present invention that includes unwinding a tarpaulin by inflating, the free end of which is secured to a winding shaft. This tarpaulin can be unwound alone without any particular mechanism and has good rigidity and excellent resistance to the wind when it is unwound.

Another aspect of the present invention relates to the winding of the tarpaulin, this aspect being in itself independent of the first one. Therefore, the tarpaulin described above could be rolled up manually. However, the aim to achieve a greenhouse that can be temperature adjusted automatically requires providing a motorised winding system. This winding system may for example comprise a rack that carries out a rotational and translational guiding and driving of the winding shaft. However, this rack system is inconvenient in that it is complex and has a high cost price.

Here, the idea of the present invention is to provide a winding system with ropes that is simple in structure, an example of which will be described below, which solely carries out the function of winding the tarpaulin and operates as a "follower" during its unwinding. It should be noted that this rope system would be very complex if it had to carry out the winding and the unwinding of the tarpaulin, and owes its simplicity to the fact that the unwinding of the tarpaulin is carried out by inflating, in accordance with the first aspect of the invention. According to the present invention, the winding function includes pulling the winding shaft in the winding direction while making it turn in the winding direction.

Figure 4A:
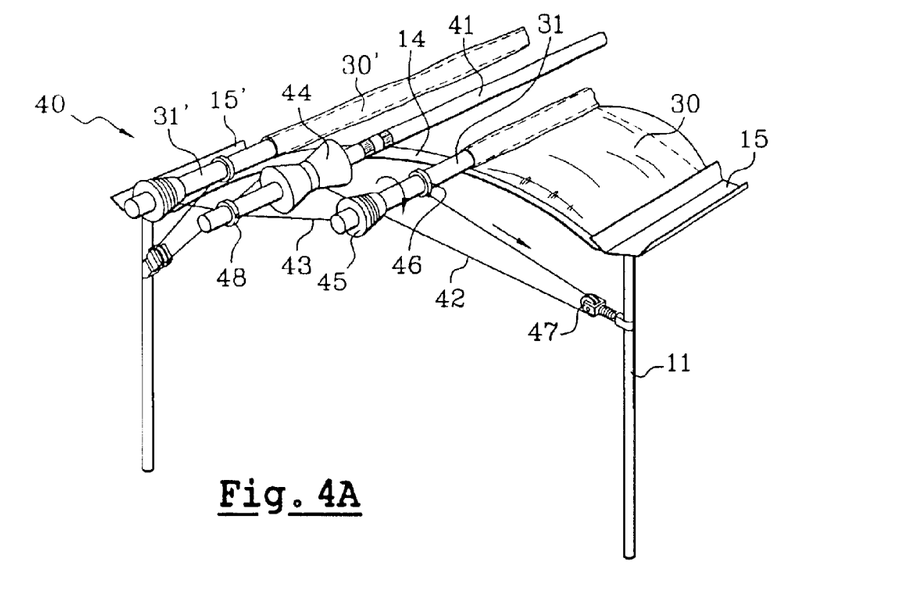
FIGS. 4A and 4B are perspective views of a tarpaulin winding system according to the present invention, respectively in a rolled up position and an unwound position.

FIG. 4A represents an example of an embodiment of a winding system 40 according to the present invention. The winding system 40 comprises a drive shaft 41 arranged lengthways at the top of the greenhouse, a traction rope 42, a rotation rope 43, a traction pulley 44 arranged at the end of the shaft 41, and a rotation pulley 45 arranged at the end of the winding shaft 31. The pulleys 44, 45 are preferably tapered in shape. The traction rope 42 has one end wound onto the pulley 44, starting with the small diameter of the pulley 44, and its other end is hooked to the winding shaft 31 by means of a ring 46 turning freely on the shaft 31, the ring 46 being mounted onto a ball bearing or arranged in a TEFLON groove. Between the traction pulley 44 and the ring 46, the rope 42 is engaged in a return pulley 47 arranged so that winding the rope 42 around the pulley 44 results in a traction movement of the shaft 31 in the winding direction. The return pulley 47 is fixed, for example, to a jamb 11 of the greenhouse, as represented in the Figure. Furthermore, the rotation rope 43 has one end wound around the pulley 45, starting with the large diameter of the pulley 45, and its other end is hooked to the drive shaft 41 by means of a ring 48 turning freely on the shaft 41.

Figure 7:
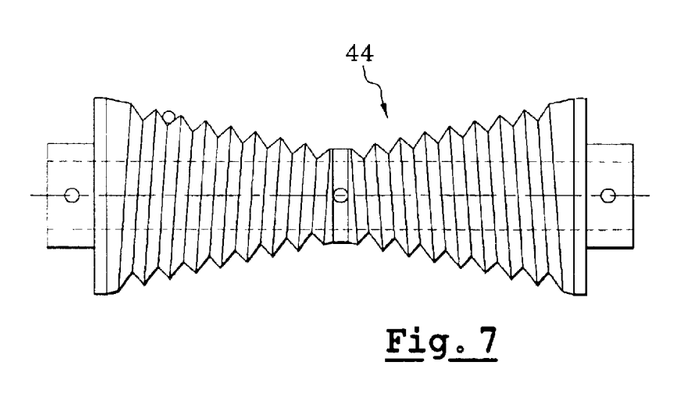
FIG. 7 represents a tapered pulley according to the present invention.

The winding system 40 comprises identical elements for the winding of the tarpaulin 30', that will not be described in order to remain simple. Thus, as represented in greater detail in FIG. 7, the pulley 44 is double and comprises two truncated cones having their small diameters opposite each other, to ensure the simultaneous traction of the two winding shafts 31, 31' by means of two ropes. Each truncated cone comprises a rope guide groove going from the small diameter towards the large diameter of the truncated cone. Furthermore, a winding system similar to the system 40 is arranged at the other end of the greenhouse (see FIG. 2), i.e. at the other ends of the shaft 41 and the winding shafts 31, 31' of each of the tarpaulins 30, 30', so as to balance the traction and winding forces.

Figure 4B:
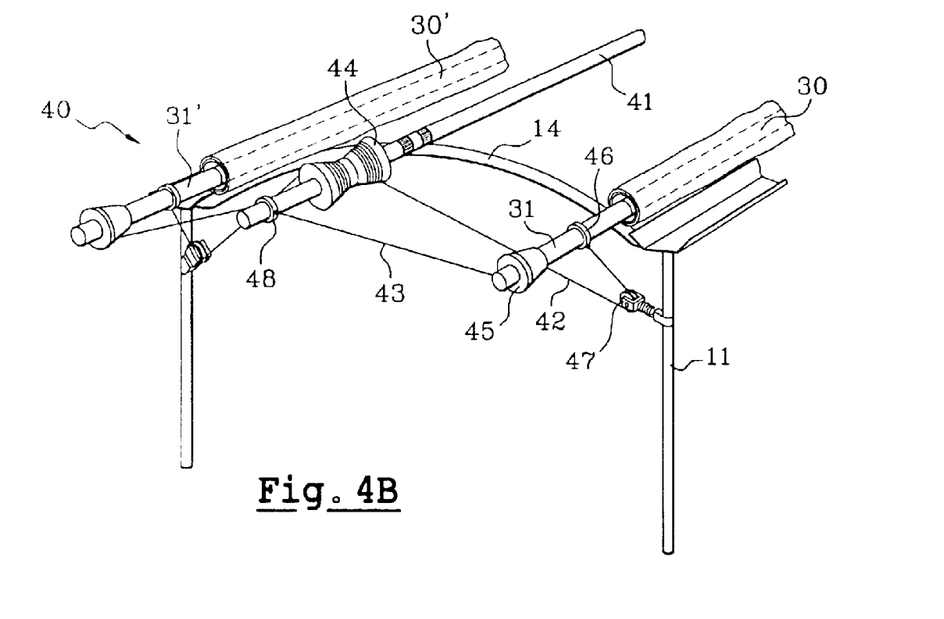

When the shaft 41 is rotationally driven in the appropriate direction, the rope 42 winds around the pulley 44 and pulls on the winding shaft 31 through the return pulley 47. Simultaneously, the rope 43 unwinds around the pulley 45 by imposing a rotation torque on the shaft 31 in the winding direction, as represented by arrows in FIG. 4A. In FIG. 4B, the tarpaulins 30, 30' can be seen entirely wound on their shafts 31, 31'. The end of the rope 42 is entirely wound on the pulley 44 on its large diameter side and the end of the rope 43 is entirely unwound on the pulley 45 on its small diameter side. Providing tapered pulleys 44, 45 is an optional feature of the present invention which enables the increasing thickness of the tarpaulin 30 to be compensated as it is rolled up, such that the drive shaft 41 turns at constant angular speed for a given winding speed.

On FIG. 2, it can be seen that the drive shaft 41 is moved by a motor 60 arranged in a central part of the greenhouse, the motor 60 being for example placed on a platform hooked to the cross-pieces of the greenhouse frame. This motor 60 comprises an yyy integrated gear motor that has a drive bearing passed through by the shaft 41. It can be seen in FIG. 3A that other bearings 61 bearing the shaft 41 are fixed to the bows 14 under the central gutter 15", the bearings 61 and the shaft 41 thus being protected from bad weather by the gutter 15".

It will be understood that different variations and embodiments may be made of the winding system 40 according to the present invention. Particularly, in FIG. 4A, the ring 46 could be replaced by a pulley with constant diameter rotating the shaft 31 when the rope 42 is pulled by the pulley 44. In this case, the respective positions of the ring 48 and of the pulley 45 could be inverted, the ring 48 being arranged on the shaft 31 and the pulley 45 arranged on the shaft 41. The pulley 45 would not, in this case, be a rotation pulley but a follower pulley. Furthermore, the central position of the shaft 41 at the top of the greenhouse is justified here out of concern to keep the winding system simple and by the need to simultaneously roll up the two tarpaulins 30, 30'. The ridge of a greenhouse according to the present invention could however be covered with a single roll-up tarpaulin. In this case, the drive shaft 41 could be arranged on the edges of the ridge.

Various other variations of the present invention can also be considered as far as the frame of the greenhouse is concerned and that of the inflatable tarpaulin. In particular, one variation includes providing a tarpaulin that has an alternation of double-membrane inflatable parts and non-inflatable parts (single or double-membrane). For example, two inflatable parts arranged sideways are sufficient to carry out the unwinding of a tarpaulin according to the present invention. The inflatable parts must stretch between the fixed edge and the free edge of the tarpaulin to carry out its complete unwinding. Furthermore, a roll-up tarpaulin according to the present invention can also be used to cover a tunnel-type greenhouse, the frame of which does not comprise vertical walls and only comprises bows. Finally, particularly in a tunnel-type greenhouse, the unwinding of the tarpaulin by inflating can be provided in a direction going from the bottom to the top or from the top to the bottom.

In practice, the various winding and unwinding elements of the tarpaulins 30, 30' according to the present invention are controlled by an adjustment system equipped with at least one temperature probe. If the temperature in the greenhouse becomes excessive, the adjustment system activates the motor 60 to gradually roll up the tarpaulins while opening the decompression valve 25 so as to enable the tarpaulins to deflate. The opening of the greenhouse may be complete or partial depending on the temperature outside, and can be done in stages of several minutes. Conversely, when the temperature of the greenhouse becomes too low, the adjustment system activates the compressor 20 to unwind the tarpaulins. In this case, the motor 60 is simultaneously activated in a rotation direction that is the opposite of the winding direction so that the traction and rotation ropes follow the closing movement of the tarpaulins. The adjustment system also activates the compressor 20 when the air pressure in the tarpaulins becomes too low, due to micro-leaks that can occur in the tarpaulins or in the air distribution system. Various other means of adjustment, particularly a rain sensor and an anemometer can be provided to ensure increased protection of the species grown, particularly in the event of bad weather.

Figure 8:
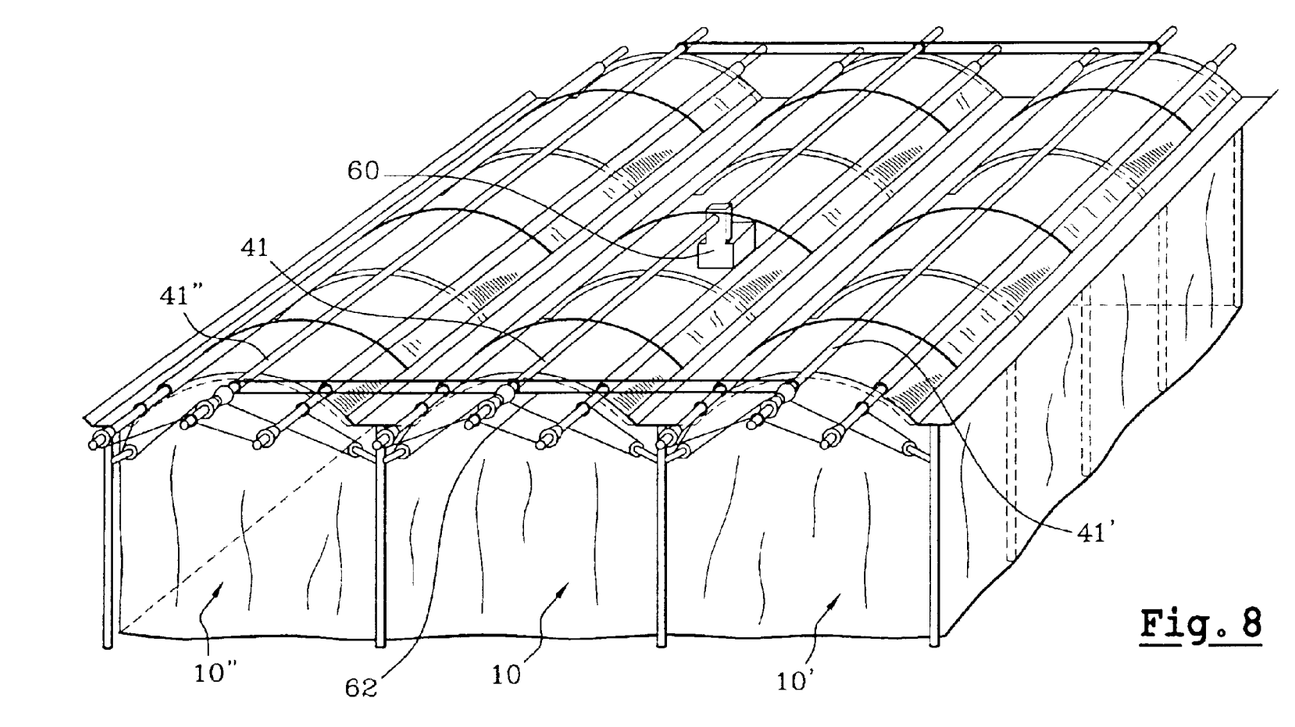
FIG. 8 represents a set of greenhouses according to the present invention.

Furthermore, a single compressor can enable the tarpaulins of several adjacent greenhouses to be driven if it is desirable to save on means. Therefore, as represented in FIG. 8, several greenhouses according to the present invention, here three greenhouses 10, 10', 10", can be arranged side-by-side to share a common compressor. The closing of the tarpaulins of each of the greenhouses is moreover carried out by a single motor 60, arranged here in the central greenhouse 10, and the drive shafts 41', 41" of the neighbouring greenhouses 10', 10" are coupled to the shaft 41 of the central greenhouse 10 by a chain or by a drive belt 62.

It will be understood that various other variations and applications may be made of the cover system according to the present invention. In particular, opaque tarpaulins unwinding by inflating can be arranged under the transparent tarpaulin of the ridge of a greenhouse to form shading devices that are unwound when the sunlight becomes too strong for the species grown.

In addition, although the preferred embodiment of the present invention uses the air pressure to carry out the unwinding of a tarpaulin while providing a simplified mechanism only carrying out the winding of the tarpaulin, the scope of the present invention could also comprise providing a mechanism carrying out both the winding and the unwinding of the tarpaulin. In this embodiment, the inflating of the tarpaulin during its unwinding is involved as a complementary means enabling the unwinding work carried out by the winding and unwinding mechanism to be reduced.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A horticultural greenhouse, comprising:
   a frame;
   a cover system supported by the frame that includes a tarpaulin having a double-membrane and being inflatable, the tarpaulin having a fixed part secured to the frame and a free edge oppositely disposed from the fixed part and secured to a rolling-up shaft, the tarpaulin being arranged in order to be able to be rotatably rolled-up and unrolled around the rolling-up shaft;
   a rolling-up system arranged to make the rolling-up shaft rotate in a rolling-up direction to cause the rolling-up of the tarpaulin around the rolling-up shaft, the rolling-up shaft being located generally at the center of a roll formed by the tarpaulin when the tarpaulin is rolled-up around the rolling-up shaft, the fixed part remaining stationary during the rolling-up of the tarpaulin, such that the fixed part remains a non-rolled-up part of the tarpaulin, the roll being proximate the fixed part when the tarpaulin is fully rolled-up, wherein the rolling-up of the tarpaulin opens the horticultural greenhouse;

at least one electrical motor to drive the rolling-up system;

at least one compressor for injecting air inside the tarpaulin when at least a portion of the tarpaulin is rolled-up around the rolling-up shaft to cause an inflation pressure within the tarpaulin, the air being injected proximate the fixed part of the tarpaulin, the inflation pressure causing the inflation of the non-rolled-up part of the tarpaulin which pushes the roll, causing the roll to move in an unrolling direction so that at least the portion of the tarpaulin unrolls from the roll to increase the non-rolled-up part of the tarpaulin inflated by the compressor, such that an unrolled and inflated portion of the tarpaulin stays behind the roll; and at least one decompression valve within the tarpaulin to allow for deflation of the tarpaulin so that the tarpaulin can be rolled-up after the tarpaulin has been unrolled;

wherein the unrolling of the tarpaulin is solely accomplished by using the compressor to inflate the tarpaulin.

2. The horticultural greenhouse according to claim 1, in which the entire useable surface of the tarpaulin is of the double-membrane inflatable type.

3. The horticultural greenhouse according to claim 1, in which the tarpaulin comprises at least one non-inflatable part and at least one double-membrane inflatable part extending between the fixed part and the free edge of the tarpaulin.

4. The horticultural greenhouse according to claim 1, in which the rolling-up of the tarpaulin is carried out by a rope system arranged to pull the rolling-up shaft in a rolling-up direction of the tarpaulin while turning the rolling-up shaft in a rolling-up direction of the tarpaulin.

5. The horticultural greenhouse according to claim 1, in which the tarpaulin is arranged in an inclined plane.

6. The horticultural greenhouse according to claim 1, wherein the tarpaulin rests on elements of a ridge of the greenhouse and is pressed against these elements by holding means.

7. The horticultural greenhouse according to claim 1, wherein the rolling-up system comprises a traction rope to pull the rolling-up shaft in a rolling-up direction of the tarpaulin, and a rotation rope to make the rolling-up shaft turn in a rolling-up direction of the tarpaulin.

8. The horticultural greenhouse according to claim 7, in which the traction and rotation ropes cooperate in rolling-up with pulleys chosen to be tapered in shape to compensate for the increasing diameter of the tarpaulin roll when the tarpaulin is being rolled-up around the rolling-up shaft.

9. The horticultural greenhouse according to claim 1, comprising means for controlling the air pressure in the tarpaulin, and means for adjusting the temperature in the greenhouse by driving the compressor, the motor and the valve to roll-up or unroll the tarpaulin depending on the difference between the temperature in the greenhouse and a desirable temperature.

10. A set of horticultural greenhouses comprising at least two greenhouses according to claim 1, the greenhouses comprising shafts for driving tarpaulin rolling-up systems, said shafts being rotationally coupled by means of a belt or a chain.

* * * * *

UNITED STATES PATENT AND TRADEMARK OFFICE
CERTIFICATE OF CORRECTION

PATENT NO.    : 6,843,019 B2
DATED         : January 18, 2005
INVENTOR(S)   : Joseph Mercurio et al.

It is certified that error appears in the above-identified patent and that said Letters Patent is hereby corrected as shown below:

<u>Column 1,</u>
Line 7, after "Jun. 5, 2002", the following should be inserted:
-- the disclosure of which is incorporated herein by reference. --

Signed and Sealed this

Twenty-fourth Day of May, 2005

JON W. DUDAS
*Director of the United States Patent and Trademark Office*